Jan. 6, 1953     H. P. DUPRE     2,624,602
SWIVEL FOR POSITIVE INITIAL GRIPS
Filed July 8, 1946
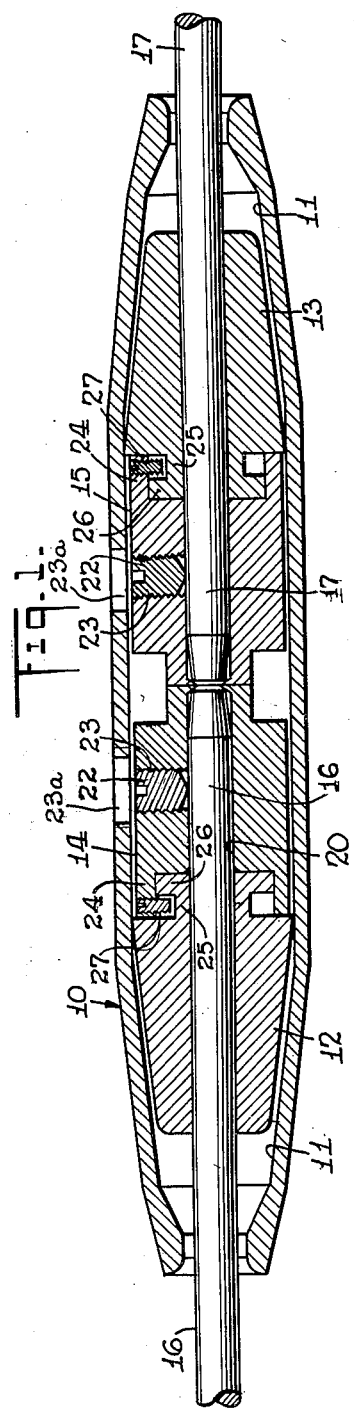
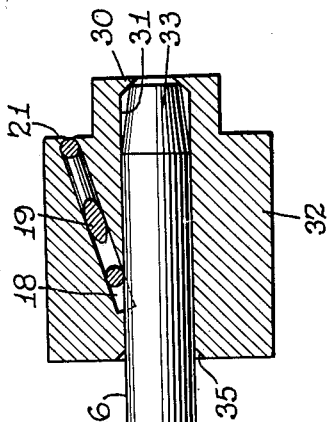
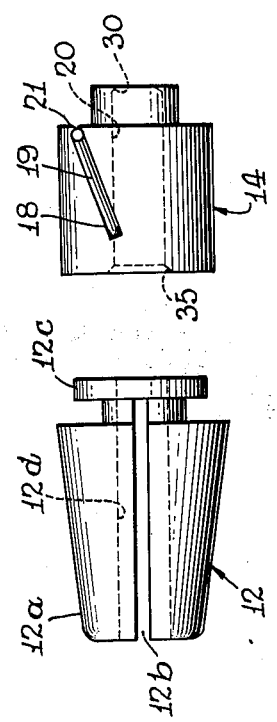
INVENTOR
*Henry Peter Dupre*
BY
*Harry Ernest Rubens*
ATTORNEY Patented Jan. 6, 1953

2,624,602

UNITED STATES PATENT OFFICE 2,624,602

SWIVEL FOR POSITIVE INITIAL GRIPS

Henry Peter Dupre, Astoria, N. Y., assignor to Burndy Engineering Company, Inc., a corporation of New York Application July 8, 1946, Serial No. 681,863

4 Claims. (Cl. 287—115)

My invention relates to automatic line splice connectors used in splicing electrical wires and cables having high mechanical tensions and more specifically to a means by which the wire is permitted to rotate inside the splice without unscrewing from the connector.

Automatic line splices usually employ a conical wire gripping jaw assembly fitting into the tapered end of a metallic tubing. The taper of the jaw assembly and tubing is such that the tension of the wire pulls the jaw assembly into the small end of the tapered tubing thereby compressing the jaw assembly on the wire and gripping the wire against pull-out. These assemblies are generally pushed forward by either a positive initial grip element in the back of the jaw, which grips the wire and forces the jaw forward when the wire is pulled, or the jaw assembly may be pushed forward by a spring which is located in the center of the connector so that when the wire is inserted into the connector, the jaw assembly compresses the wire and upon pulling the wire, the spring pushes the jaws into the tapered section of the sleeve thereby gripping the wire.

This invention deals only with the type using the positive initial grip element which may consist of (1) a spring catch or (2) a set screw, (3) a cam action of some kind, or (4) a wedge. These elements have heretofore been rigidly attached to the jaw assembly so that the wire will pull the positive initial grip element with the jaws, thereby gripping the wire.

During installation, the wire is unrolled from coils and there is a tendency for the end of the wire to untwist from the main gripping jaw of the splice by an unscrewing action. If the positive initial grip element is rigidly connected to the main gripping jaws, the wire will be pulled from the element by the unscrewing action in the jaws. If this occurs, the wire may drop from the splice during installation.

It is therefore the object of my invention to provide a means by which the wire can be rotated with respect to the automatic line splice without causing any injury to the wire or unscrewing the wire from the automatic line splice before the splice can be put under full tension.

Another object is to provide this automatic swivel without increasing the length or bulk over that of the standard automatic line splice.

Still another object is to provide such a swivel without increasing the cost of the connector.

A further object is to provide a stop in the positive initial grip so that the first wire inserted will not interfere with the operation of the gripping elements for the second wire.

I accomplish these and other objects and obtain my new results as will be apparent from the device described in the following specification, particularly pointed out in the claims, and illustrated in the accompanying drawing in which:

Fig. 1 is a longitudinal sectional view of a line splice illustrating one type of positive initial gripping elements, employing my invention;

Fig. 2 is an exploded view of a pair of gripping jaws separated from a modified positive initial gripping element;

Fig. 3 illustrates a stop means on the modified positive initial gripping element for preventing the wire from passing entirely therethrough.

Referring more in detail to Fig. 1 of the drawing, reference numeral 10 designates a typical line splice having a tapered envelope 11 and a pair of opposed jaw units 12 and 13.

Positive initial grip elements 14 and 15 are positioned between the main gripping jaw units 12 and 13, respectively, for operating the main gripping jaws to force them into the tapered ends of the casing when tension is applied to the wire ends 16 and 17, thereby forcibly gripping the wire ends. The gripping jaw units may be of the type illustrated, in Fig. 2, having flexible finger-like jaws 12a, provided with slots 12b extending to the supporting section 12c which holds the jaws in position. The central bore 12d may be serrated for gripping purposes.

Two forms are illustrated. The positive initial gripping element 14a is provided with an oblique slot 18 into which is positioned a Z-shaped spring 19, a portion of which extends into the central bore 20 therein. The peened-over metal 21 adjacent the mouth of the slot holds the spring under slight compression. When the wire end 16 is inserted into the bore, and an effort is made to withdraw it, the bottom portion of the Z-shaped spring will wedge itself between the wire and the inside wall of the slot, thereby resisting withdrawal.

By making the main gripping jaw unit separate from the positive initial gripping element, the wire end and the positive initial gripping element may rotate as a unit, independently of the main jaws, especially at low pull-out values. The wire is, therefore, held in position even though it may cause the positive initial gripping element to rotate while the wire untwists.

The positive initial gripping element illustrated in the splice in Fig. 1 consists of the set screw type and comprises the set screw 22 positioned in the transversely positioned threaded aperture 23 enabling the set screw to engage the wire end 17 and hold it securely therein. Hereto the positive initial gripping element may rotate freely and independently of the main jaw unit assembly 13.

It may be advantageous to allow the positive initial gripping element to rotate with respect to the main gripping jaw assembly and still be retained as a unit therewith.

This may be accomplished by extending a circumferential ledge 24 of the positive initial gripping element over the extending neck section 25 of the main jaws and providing a collar 26 for said neck. By inserting a set screw 27 through the ledge but not touching the neck section of the main jaws, the collar will prevent the jaws from coming apart from the positive initial gripping element while permitting the positive initial gripping element to rotate thereon.

The gripping elements including set screws 22 and 27 are positioned in the opened envelope 11 before the closing end is swaged to contain the same. Access to the screw 23 thereafter is made through the slot 23a, to grip the inserted conductors.

In Fig. 3 I have shown a circumferential peened-over edge 30 on the end of the central bore 31 in the positive initial gripping element 32. It will thus be possible to prevent the wire end 33 from one positive initial gripping element from interfering with the operation of the adjacent positive initial gripping element and eliminate the necessity for a separator between the adjacent elements.

In order to insure proper entry of the wire into the separated units, a chamfer 35 is supplied to the central bore at the entrance thereof so that the wire will find its way therein without jamming. Thus, any difficulty arising out of the separation of the units will be avoided.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What is claimed is:

1. A connector for joining a wire thereto comprising a housing, having an internal taper at one end, a main set of gripping jaws in the housing and having tapered surfaces for compressing the jaws when forced into the tapered end of the housing; and a positive initial gripping element for securement to the end of the wire when inserted therein and rotatable with respect to the main set of gripping jaws and capable of slidable movement in the housing, said positive initial gripping element when attached to the end of the wire adapted to be moved by the movement of the wire only, against the adjacent surface of the main set of gripping jaws, causing the main set of gripping jaws to be moved in the housing and forced against the tapered portion of the housing, compressing the jaws onto the wire.

2. A connector for joining a wire thereto comprising a housing, having an internal taper at one end, a main set of gripping jaws in the housing and having tapered surfaces for compressing the jaws when force into the tapered end of the housing, a positive initial gripping element rotatably mounted on said main set of gripping jaws and secured thereto to prevent separation, said positive initial gripping element when attached to the end of the wire adapted to be moved by the movement of the wire only against the adjacent surface of the main set of gripping jaws, causing the main set of gripping jaws to be moved in the housing and forced against the tapered portion of the housing, compressing the jaws onto the wire.

3. A connector for joining a wire thereto comprising a housing, having an internal taper at one end, a main set of gripping jaws in the housing and having tapered surfaces for compressing the jaws when forced into the tapered end of the housing; and a positive initial gripping element for securement to the end of the wire when inserted therein and rotatable with respect to the main set of gripping jaws and capable of slidable movement in the housing, said positive initial gripping element when attached to the end of the wire adapted to be moved by the movement of the wire only, against the adjacent surface of the main set of gripping jaws, causing the main set of gripping jaws to be moved in the housing and forced against the tapered portion of the housing, compressing the jaws onto the wire, said positive initial gripping element provided with a central bore adapted to receive the wire and a transversely positioned set screw entering the bore for locking the wire to said positive initial gripping element.

4. A connector for joining a wire thereto comprising a housing having an internal taper at one end, a main set of gripping jaws in the housing and having tapered surfaces for compressing the jaws when forced into the tapered end of the housing, and a positive initial gripping element rotatable with respect to the main set of gripping jaws and separable longitudinally therefrom, said positive initial gripping element having means for positively locking the end of the wire thereto and adapted to be moved by the movement of the wire only, against the main set of gripping jaws, causing said jaws to be moved in the housing and forced against the tapered portion of the housing, compressing the jaws onto the wire.

HENRY PETER DUPRE.

REFERENCES CITED

The following references are of record in the file of this patent:

UNITED STATES PATENTS

| Number | Name | Date |
| --- | --- | --- |
| 667,875 | Garrels et al. | Feb. 12, 1901 |
| 2,166,458 | Berndt et al. | July 18, 1939 |
| 2,209,620 | Berndt et al. | July 30, 1940 |
| 2,215,072 | Rogoff | Sept. 17, 1940 |

FOREIGN PATENTS

| Number | Country | Date |
| --- | --- | --- |
| 579,499 | Germany | June 27, 1933 |